(12) United States Patent
Hiebaum et al.

(10) Patent No.: US 11,541,760 B2
(45) Date of Patent: Jan. 3, 2023

(54) CURRENT COLLECTOR ASSEMBLY FOR A VEHICLE

(71) Applicant: SIEMENS AG ÖSTERREICH, Vienna (AT)

(72) Inventors: Christian Hiebaum, Gössendorf (AT); Mario Preiss, Anger (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 782 days.

(21) Appl. No.: 16/446,843

(22) Filed: Jun. 20, 2019

(65) Prior Publication Data

US 2019/0389312 A1 Dec. 26, 2019

(30) Foreign Application Priority Data

Jun. 22, 2018 (AT) .............................. A 50520/2018

(51) Int. Cl.
*B60L 5/39* (2006.01)
*B61C 3/00* (2006.01)

(52) U.S. Cl.
CPC ........ *B60L 5/39* (2013.01); *B61C 3/00* (2013.01); *B60L 2200/26* (2013.01)

(58) Field of Classification Search
CPC ........... B60L 5/39; B60L 2200/26; B61C 3/00
See application file for complete search history.

(56) References Cited

FOREIGN PATENT DOCUMENTS

| CN | 204845580 | 12/2015 | |
|---|---|---|---|
| CN | 204845580 U | * 12/2015 | ................ B60L 5/39 |
| CN | 204845580 U | 12/2015 | |
| DE | 280297 | 7/1990 | |
| DE | 102004019252 B3 | 6/2005 | |

* cited by examiner

*Primary Examiner* — Robert J McCarry, Jr.
(74) *Attorney, Agent, or Firm* — Cozen O'Connor

(57) ABSTRACT

A current collector assembly for a vehicle, in particular for a rail vehicle, includes a current collector with a current collector arm and a sliding piece for current collection from a power rail and includes a carrier, wherein the current collector being connectable to the vehicle via the carrier, where a first shaft and a second shaft are rotatably linked to the carrier and are arranged rotated relative to one another, where the second shaft is coupled to the current collector arm and arranged between the first shaft, and where the second shaft is a lever device that includes a first lever connected to the first shaft, a second lever connected to the second shaft and a rod coupled to the first lever and the second lever such that a torque deflecting device with flexible installation space utilization is achieved.

16 Claims, 2 Drawing Sheets

CURRENT COLLECTOR ASSEMBLY FOR A VEHICLE

BACKGROUND OF THE INVENTION

1. Field of the Invention

The invention relates to a current collector assembly for a vehicle, in particular for a rail vehicle, which has a current collector with a current collector arm and a sliding piece connected to the current collector arm for current collection from a power rail, and has a carrier, where the current collector is connectable via the carrier to the vehicle.

2. Description of the Related Art

Current collectors having sliding pieces that are pressed onto power rails must be configured liftable from the power rail in order to enable, firstly, a separability of the vehicle from a power supply and, secondly, operational displacements of the current collector. It is also often required to lift the current collector from the power rail manually, i.e., for example, via an insulated actuating device, from a door region or an exterior of the vehicle. For this purpose, a torque deflection between the actuating device and the current collector arm is typically required so that a corresponding lifting force or, for a return of the sliding piece to the power rail, an application force on the sliding piece can be created. This torque deflection is often enabled by means of a gearbox (e.g., via a bevel gear transmission) which, however, often results in a large mass, a high design and production cost and a large space demand in the vehicle (e.g., in the region of a chassis).

DD 280 297 A1 discloses an exemplary conventional current collector for a power rail. The current collector has a drive, a drive linkage, a sprung guidance mechanism and a pivot lever, where the sprung guidance mechanism and the pivot lever function as a toggle joint in order, via a pivot movement, to place a contact slipper onto the power rail or to lift it therefrom.

The approach considered has the disadvantage in its known form that no actuation of the current collector in a plane rotated relative to the working plane of the current collector, as shown in DD 280 297 A1, is possible.

SUMMARY OF THE INVENTION

It is an object of the invention to provide a further developed current collector assembly as compared with the prior art, which enables an actuation in a plane that is rotated relative to a current collector working plane.

This and other objects and advantages are achieved in accordance with the invention by a current collector assembly in which a first shaft and a second shaft are rotatably linked to the carrier, where the first shaft and the second shaft are arranged rotated relative to one another, the second shaft is coupled to the current collector arm and arranged between the first shaft and the second shaft is a lever device that comprises a first lever connected to the first shaft, a second lever connected to the second shaft and a rod coupled to the first lever and the second lever.

By reason of a rotation of the first shaft and the second shaft against one another, a favorable torque deflection from the first shaft to the second shaft and thus, for example, from an actuating device connected to the first shaft to the current collector arm coupled to the second shaft is achieved. With this, the current collector can be actuated from a door region or an exterior region of the vehicle, i.e., a change of an actuating direction of the current collector takes place and thus via the actuating device provided in one of these regions, a lifting or application force can be exerted on the sliding piece.

The lever device enables a flexible installation space utilization and is simple in design and therefore economical, particularly in comparison with a gear transmission. Furthermore, the lever device has a low mass as compared with a gear transmission.

The lever device can be configured narrow (for example, the first lever and the second lever can be provided in a region with a particularly small installation space allowance), so that free space infringements can be prevented.

It is favorable if the first lever and the second lever have different lever lengths. With this measure, apart from a torque deflection, a torque or force conversion and a translation of an actuating distance that is to be implemented by the actuating device is achieved. Through a suitable choice of the lever lengths, short actuating paths are achieved.

In an advantageous embodiment, the first shaft and the second shaft are arranged offset in height relative to one another. With this measure, if the available installation space in the width direction of the vehicle is particularly small, then the available installation space allowance in the height direction of the vehicle can be utilized in a favorable manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described in greater detail making reference to exemplary embodiments, in which.

DETAILED DESCRIPTION OF THE EXEMPLARY EMBODIMENTS

Figure 1:
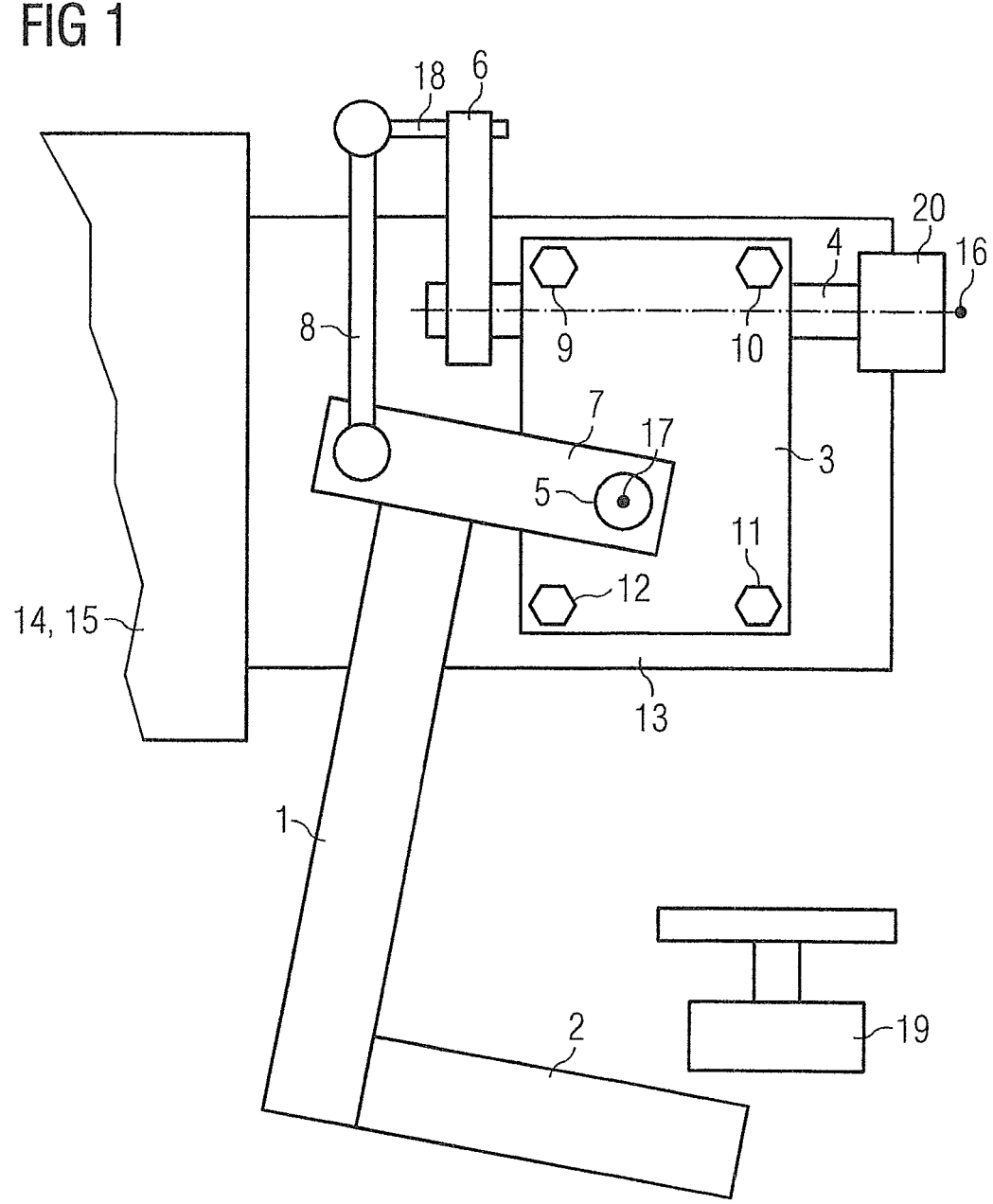
FIG. 1 is a side view of an exemplary embodiment of an inventive current collector assembly in a first state in which a sliding piece is lifted off a power rail.

An exemplary embodiment of an inventive current collector assembly shown in side view in FIG. 1 has a current collector arm 1 and a sliding piece 2 that form a current collector, and a carrier 3 via which the current collector assembly is connected to a chassis (shown only partially) of a rail vehicle (not shown). In accordance with the invention, it is also conceivable that the sliding piece 2 is configured as a contact slipper. The carrier 3 is connected via a first hexagonal bolt 9, a second hexagonal bolt 10, a third hexagonal bolt 11 and a fourth hexagonal bolt 12 to a bracket 13 that is welded to a longitudinal support 14 of a chassis frame 15 of the chassis.

A first shaft 4 and a second shaft 5 are rotatably mounted in the carrier 3. A first longitudinal axis 16 of the first shaft 4 is arranged rotated by 90° relative to a second longitudinal axis 17 of the second shaft 5 which is represented projecting in FIG. 1, via which a torque deflection from the first shaft 4 to the second shaft 5 is enabled.

The first shaft 4 and the second shaft 5 are therefore arranged rotated by 90° relative to one another. In accordance with the invention, however, angles other than 90°, i.e. any desired angles, are also conceivable.

A first lever 6 is firmly connected to the first shaft 4, i.e., the first lever 6 can rotate with the first shaft 4. A second lever 7 is firmly connected to the second shaft 5, i.e., the second lever 7 can rotate with the second shaft 5.

Provided between the first lever 6 and the second lever 7 is a rod 8 that is connected by a first connecting rod 18 via a ball joint to the first lever 6 and by a second connecting rod (not shown) via a ball joint to the second lever 7.

The first lever 6, the second lever 7 and the rod 8 are components of a lever device for transmitting forces and torques from the first shaft 4 to the current collector arm 1 and the sliding piece 2.

The current collector arm 1 is firmly connected to the second lever 7 and therefore to the second shaft 5. In accordance with the invention, however, it is also conceivable to connect the current collector arm 1 firmly and directly to the second shaft 5. The current collector arm 1 moves with the second shaft 5 and/or with the second lever 7. The sliding piece 2 is firmly connected to the current collector arm 1, rotated by 90° thereto.

The sliding piece 2 is provided at a lower end of the current collector arm 1 and, via a transfer of forces and torques from the first shaft 4 to the sliding piece 2, can be pressed from below against a power rail 19.

FIG. 1 shows a first state in which the sliding piece 2 is lifted off the power rail 19. For lifting the sliding piece 2 off the power rail 19, such as from a door region (not shown) of the rail vehicle, a current collector actuating device (also not shown) configured as an insulated actuating rod is coupled to an adapter 20 that is linked to the first shaft 4. The current collector actuating device is thus connected via the adapter 20 to the first shaft 4.

With the current collector actuating device, the adapter 20 and thus the first shaft 4 are rotated such that the first lever 6 performs a pivot movement upwardly and, via the first connecting rod 18, pulls the rod 8 with it. Due to a movement of the rod 8 and its connection to the second lever 7 via the second connecting rod, the second lever 7 pivots outwardly or completes a clockwise rotary movement, whereby the second longitudinal axis 17 of the second shaft 5 functions as the rotary axis. With this, the current collector arm 1 and the sliding piece 2 again perform a pivoting movement whereby the sliding piece 2 moves downwardly and consequently lifts off the power rail 19.

In this first state, a snap closure (not shown) arranged on the first shaft 4 is engaged in a locking catch (also not shown), which is provided in the carrier 3. The current collector is thus locked in this first state.

In accordance with the invention, it is also conceivable that the power rail 19 is arranged rotated through 180° in relation to the embodiment shown in FIG. 1 and the sliding piece 2 touches the power rail 19 from above, whereby via the current collector actuating device, movements for lifting and applying the sliding piece 2 are performed with movement directions adapted to the arrangement of the power rail 19 rotated by 180°. Furthermore, the inventive current collector assembly is also usable for all angular positions of the power rail 19 between 0° and 180°.

It is also conceivable that an actuating unit with which lifting and applying processes of the sliding piece 2 can be performed automatically is connected to the first shaft 4.

It is further conceivable that the current collector assembly is not connected to the chassis frame 15 but, for example, to a wheelset bearing housing or to a carriage superstructure, etc.

It is also conceivable to use the inventive current collector assembly for electric buses, electric commercial vehicles and electric automobiles, etc., and to use power rails 19 that are provided on the edge of a roadway or are integrated into the roadway.

Figure 2:
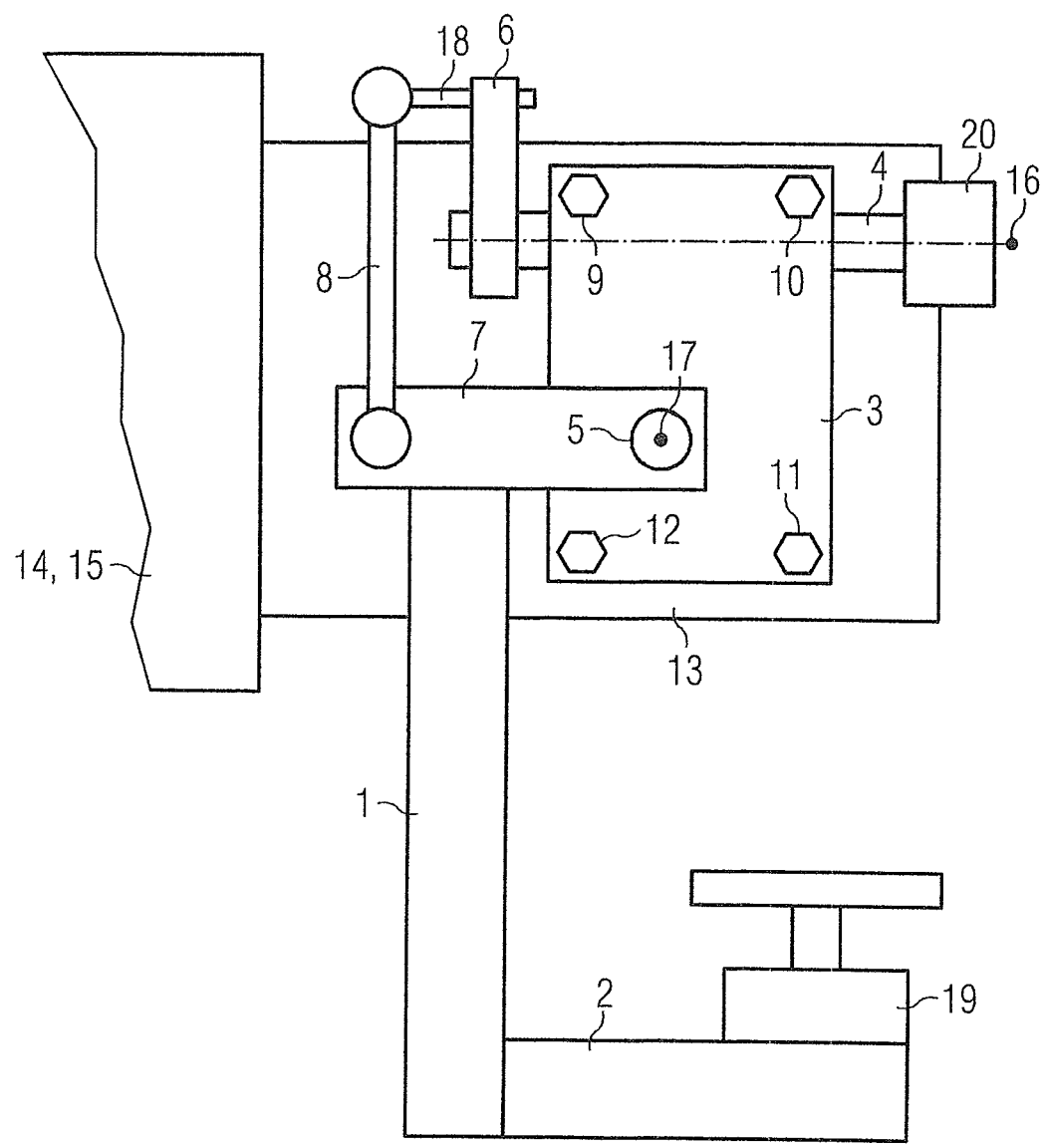
FIG. 2 is a side view of the exemplary embodiment shown in FIG. 1 of an inventive current collector assembly in a second state in which the sliding piece lies on the power rail.

FIG. 2 shows the exemplary embodiment of an inventive current collector assembly for a rail vehicle that is shown in FIG. 1. Therefore, the same reference signs are used in FIG. 2 as in FIG. 1.

As distinct from FIG. 1, FIG. 2 shows a second state of the current collector assembly in which a sliding piece 2 lies against a power rail 19 and thus the rail vehicle is supplied with electricity.

In order to apply the sliding piece 2 onto the power rail 19, a current collector actuating device (not shown) is coupled to an adapter 20 that is linked to the first shaft 4. With the current collector actuating device, the adapter 20 and thus the first shaft 4 are rotated such that a snap closure (not shown) disengages from a locking catch (also not shown), a first lever 6 firmly connected to the first shaft 4 performs a pivot movement downwardly and pulls with it a rod 8 that is connected by a first connecting rod 18 to the first lever 6. Due to a movement of the rod 8 and its connection to a second lever 7 via a second connecting rod, the second lever 7 pivots out or completes a counterclockwise rotary movement, whereby a second longitudinal axis 17 of a second shaft 5 that is firmly connected to the second lever 7 functions as the rotation axis. With this again, a current collector arm 1 that is connected to the second lever 7, and the sliding piece 2 that is connected to the current collector arm 1 perform a pivot movement whereby the sliding piece 2 moves upwardly and consequently becomes placed onto the power rail 19.

In order, with the sliding piece 2 lying against the power rail 19, to bring about a compensation of height errors in the power rail 19 and to prevent contact interruptions between the sliding piece 2 and the power rail 19, provided between a carrier 3 connected to the rail vehicle and the current collector arm 1 is a spring device (not shown) that exerts restoring forces on the sliding piece 2, so that an unintended lifting of the sliding piece 2 from the power rail 19 is prevented.

If no current collector actuating device is used, following a manual or automatic releasing of the snap closure from the locking catch, with this spring device, an automatic application of the sliding piece 2 into the power rail 19 occurs.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A current collector assembly for a vehicle, comprising:
   a current collector with a current collector arm and a sliding piece connected to the current collector arm for current collection from a power rail; and
   a carrier, the current collector being connectable to the vehicle via the carrier;
   a first shaft and a second shaft rotatably linked to the carrier, the second shaft being coupled to the current collector arm, and the first shaft and the second shaft being arranged rotated relative to one another, a first longitudinal axis of the first shaft being arranged rotated relative to a second longitudinal axis of the second shaft; and
   a lever device arranged between the first shaft and the second shaft, said lever device comprising a first lever connected to the first shaft, a second lever connected to the second shaft and a rod coupled to the first lever and the second lever.

2. The current collector assembly as claimed in claim 1, wherein the first lever and the second lever have different lever lengths.

3. The current collector assembly as claimed in claim 1, wherein the first shaft and the second shaft are arranged offset in height relative to one another.

4. The current collector assembly as claimed in claim 2, wherein the first shaft and the second shaft are arranged offset in height relative to one another.

5. The current collector assembly as claimed in claim 1, wherein a current collector actuating device is connectable to the first shaft.

6. The current collector assembly as claimed in claim 2, wherein a current collector actuating device is connectable to the first shaft.

7. The current collector assembly as claimed in claim 3, wherein a current collector actuating device is connectable to the first shaft.

8. The current collector assembly as claimed in claim 1, wherein the current collector is connectable via the carrier to a chassis of the vehicle.

9. The current collector assembly as claimed in claim 2, wherein the current collector is connectable via the carrier to a chassis of the vehicle.

10. The current collector assembly as claimed in claim 3, wherein the current collector is connectable via the carrier to a chassis of the vehicle.

11. The current collector assembly as claimed in claim 5, wherein the current collector is connectable via the carrier to a chassis of the vehicle.

12. The current collector assembly as claimed in claim 1, wherein has the current collector is connectable via the carrier to a carriage superstructure of the vehicle.

13. The current collector assembly as claimed in claim 2, wherein has the current collector is connectable via the carrier to a carriage superstructure of the vehicle.

14. The current collector assembly as claimed in claim 3, wherein has the current collector is connectable via the carrier to a carriage superstructure of the vehicle.

15. The current collector assembly as claimed in claim 5, wherein has the current collector is connectable via the carrier to a carriage superstructure of the vehicle.

16. The current collector assembly as claimed in claim 1, wherein the vehicle is a rail vehicle.

* * * * *